US012756412B2

(12) United States Patent
Kim et al.

(10) Patent No.: US 12,756,412 B2
(45) Date of Patent: Oct. 6, 2026

(54) SPIKE NEURON-BASED WAKE-UP CIRCUIT AND OPERATION METHOD THEREOF

(71) Applicant: ELECTRONICS AND TELECOMMUNICATIONS RESEARCH INSTITUTE, Daejeon (KR)

(72) Inventors: Sung Eun Kim, Daejeon (KR); Tae Wook Kang, Daejeon (KR); Hyuk Kim, Daejeon (KR); Young Hwan Bae, Daejeon (KR); Kyung Jin Byun, Daejeon (KR); Kwang IL Oh, Daejeon (KR); Jae-Jin Lee, Daejeon (KR); In San Jeon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 305 days.

(21) Appl. No.: 18/663,409

(22) Filed: May 14, 2024

(65) Prior Publication Data

US 2025/0070808 A1 Feb. 27, 2025

(30) Foreign Application Priority Data

Aug. 23, 2023 (KR) ........................ 10-2023-0110459

(51) Int. Cl.
*H04B 1/12* (2006.01)
*H02J 13/00* (2026.01)
(Continued)

(52) U.S. Cl.
CPC ............. *H04B 1/12* (2013.01); *H04B 1/1018* (2013.01); *H04B 1/1607* (2013.01)

(58) Field of Classification Search
None
See application file for complete search history.

(56) References Cited

U.S. PATENT DOCUMENTS 5,790,946 A * 8/1998 Rotzoll ............. H04W 52/0229 455/343.1
6,593,845 B1 * 7/2003 Friedman ........... G06K 19/0701 342/51
(Continued)

FOREIGN PATENT DOCUMENTS

JP 2011-210265 A 10/2011
KR 10-2007-0061251 A1 6/2007
(Continued)

*Primary Examiner* — Pablo N Tran
(74) *Attorney, Agent, or Firm* — LRK PATENT LAW FIRM

(57) ABSTRACT

Disclosed is a wake-up circuit including a preprocessing unit that generates a first signal by removing noise from an input signal, a comparison unit that generates a second signal based on the first signal and weight data, an output circuit that generates a power signal based on the second signal and an initialization signal, and a micro control unit (MCU) that generates the initialization signal based on a state signal received from the output circuit. The comparison unit includes a spike neuron network structure that generates the second signal by applying the weight data to the first signal. The output circuit supplies power to an external sensor node in response to the power signal.

16 Claims, 6 Drawing Sheets

(51) Int. Cl.

| | |
|---|---|
| ***H04B 1/10*** | (2006.01) |
| ***H04B 1/16*** | (2006.01) |
| ***H04B 7/00*** | (2006.01) |

(56) References Cited

U.S. PATENT DOCUMENTS

| | | | | |
|---|---|---|---|---|
| 7,884,723 | B2 * | 2/2011 | Jung | G06K 19/07749<br>340/572.1 |
| 8,054,159 | B2 | 11/2011 | Hyoung et al. | |
| 8,824,345 | B2 * | 9/2014 | Kim | H04W 52/0235<br>455/574 |
| 11,302,859 | B2 | 4/2022 | Chaput et al. | |
| 2004/0077383 | A1 * | 4/2004 | Lappetelainen | H04W 52/0229<br>455/574 |
| 2006/0128349 | A1 * | 6/2006 | Yoon | H04W 52/0235<br>455/574 |
| 2008/0136603 | A1 * | 6/2008 | Choi | G06K 19/0723<br>340/10.33 |
| 2010/0314452 | A1 * | 12/2010 | Yeo | G06K 19/0705<br>235/492 |
| 2011/0140851 | A1 * | 6/2011 | Lee | H04W 52/0235<br>340/9.1 |
| 2011/0239020 | A1 | 9/2011 | Thomas et al. | |

FOREIGN PATENT DOCUMENTS

| | | | |
|---|---|---|---|
| KR | 10-2022-0068884 | A | 5/2022 |
| KR | 10-2511129 | B1 | 3/2023 |

* cited by examiner

SPIKE NEURON-BASED WAKE-UP CIRCUIT AND OPERATION METHOD THEREOF

CROSS-REFERENCE TO RELATED APPLICATION(S)

This application claims priority under 35 U.S.C. § 119 to Korean Patent Application No. 10-2023-0110459 filed on Aug. 23, 2023, in the Korean Intellectual Property Office, the disclosures of which are incorporated by reference herein in their entireties.

BACKGROUND

1. Field of the Invention

Embodiments of the present disclosure described herein relate to a wake-up circuit for a sensor node, and more particularly, relate to a spike neuron-based wake-up circuit and an operating method thereof.

2. Description of Related Art

A typical sensor node spends most of its time in a standby mode for waiting for external data. The time required for the sensor node to detect the external data is only a small portion of the overall time. Accordingly, the sensor node may consume unnecessary power while waiting for the external data. To address these issues, a common approach is to implement a wake-up circuit that reduces the battery consumption of the sensor node, minimizes power consumption, and increases the operating time.

There are various ways to implement the wake-up circuit. Some wake-up circuits consume too much power or have an overly complex structure. Accordingly, the implementation of a wake-up circuit with a simple structure, low power consumption, and robustness to external noise is required.

SUMMARY

Embodiments of the present disclosure provide a wake-up circuit that is applicable to a mobile device and a wearable sensor, consumes low power, and is robust to external noise.

According to an embodiment, a wake-up circuit includes a preprocessing unit that generates a first signal by removing noise from an input signal, a comparison unit that generates a second signal based on the first signal and weight data, an output circuit that generates a power signal based on the second signal and an initialization signal, and a micro control unit (MCU) that generates the initialization signal based on a state signal received from the output circuit. The comparison unit includes a spike neuron network structure that generates the second signal by applying the weight data to the first signal. The output circuit supplies power to an external sensor node in response to the power signal.

In an embodiment, the comparison unit includes a synapse that receives the first signal and applies the weight data, a membrane capacitor that accumulates an output of the synapse and has an end connected to a ground node, and a comparison unit that generates the second signal by comparing a potential of the membrane capacitor and a threshold potential.

In an embodiment, the comparison unit includes a spike encoder that receives the first signal and generates a plurality of encoding signals, a plurality of synapses, which respectively receive the encoding signals and which respectively apply different weights, a plurality of membrane capacitors, which respectively accumulate outputs of the plurality of synapses, and each of which has one end connected to a ground node, a plurality of comparators that generate comparison signals by respectively comparing potentials of the membrane capacitors with a threshold potential, and a determination stage that receives the comparison signals, and generates the second signal by determining whether the comparison signals are caused by noise or the input signal.

In an embodiment, the weight data includes data input by a user or data generated based on learning of the spike neuron network structure.

In an embodiment, the output circuit includes a Muller-C circuit that has the initialization signal and the second signal as inputs and generates the power signal as an output.

In an embodiment, the wake-up circuit further includes a post-amplifier that receives power based on the power signal and generates an output signal by amplifying the first signal.

In an embodiment, the preprocessing unit includes a preprocessing circuit that removes noise from the input signal and generates a preprocessing signal by filtering signals of specific band frequencies, and a pre-amplifier that generates the first signal by amplifying the preprocessing signal.

In an embodiment, the preprocessing circuit includes a rectifier that removes the noise of the input signal, and a filter that filters the signals of the specific band frequencies of the input signal.

According to an embodiment, an operating method of a wake-up circuit includes receiving an input signal from an external device, generating a first signal having frequencies of a specific band by removing noise from the input signal, generating a second signal by applying weight data to the first signal based on a spike neuron network structure, generating a power signal based on the second signal and an initialization signal, and supplying power to a sensor node in response to the power signal.

In an embodiment, the second signal is generated through a comparison unit. The comparison unit includes a synapse that receives the first signal and applies the weight data, a membrane capacitor that accumulates an output of the synapse and has an end connected to a ground node, and a comparison unit that generates the second signal by comparing a potential of the membrane capacitor and a threshold potential.

In an embodiment, the second signal is generated through a comparison unit. The comparison unit includes a spike encoder that receives the first signal and generates a plurality of encoding signals, a plurality of synapses, which respectively receive the encoding signals and which respectively apply different weights, a plurality of membrane capacitors, which respectively accumulate outputs of the plurality of synapses, and each of which has one end connected to a ground node, a plurality of comparators that generate comparison signals by respectively comparing potentials of the membrane capacitors with a threshold potential, and a determination stage that receives the comparison signals, and generates the second signal by determining whether the comparison signals are caused by noise or the input signal.

In an embodiment, the weight data includes data input by a user or data generated based on learning of the spike neuron network structure.

In an embodiment, the output circuit includes a Muller-C circuit that has the initialization signal and the second signal as inputs and generates the power signal as an output.

In an embodiment, the method further includes supplying power to a post-amplifier, which is included in the wake-up circuit and configured to amplify the first signal, based on the power signal.

In an embodiment, the first signal is generated by a preprocessing unit. The preprocessing unit includes a preprocessing circuit that removes noise from the input signal and generates a preprocessing signal by filtering signals of specific band frequencies, and a pre-amplifier that generates the first signal by amplifying the preprocessing signal.

In an embodiment, the preprocessing circuit includes a rectifier that removes the noise of the input signal, and a filter that filters the signals of the specific band frequencies of the input signal.

BRIEF DESCRIPTION OF THE DRAWINGS

The above and other objects and features of the present disclosure will become apparent by describing in detail embodiments thereof with reference to the accompanying drawings.

DETAILED DESCRIPTION

Hereinafter, embodiments of the present disclosure will be described in detail and clearly to such an extent that an ordinary one in the art easily implements the present disclosure.

Figure 1:
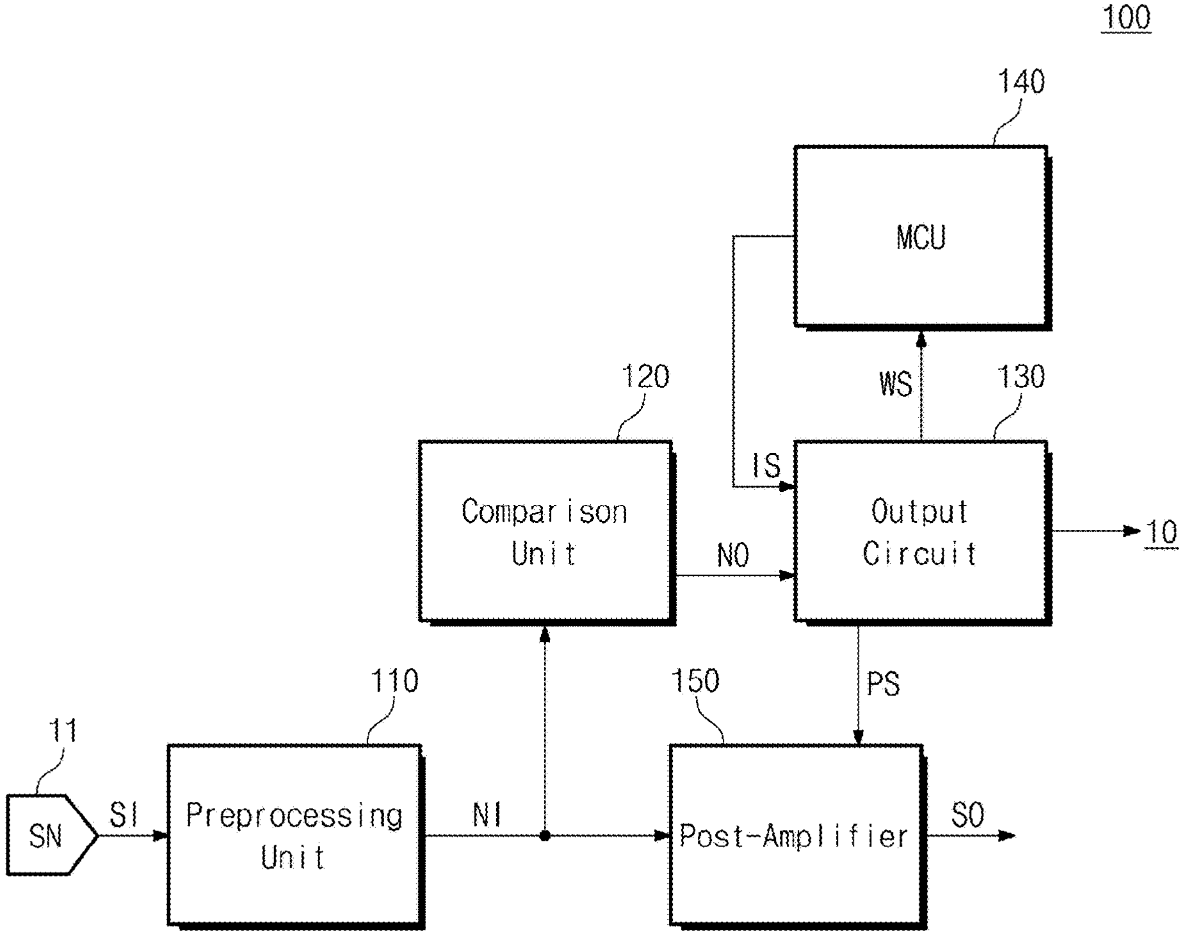
FIG. 1 is a diagram illustrating a wake-up circuit, according to an embodiment of the present disclosure.

FIG. 1 is a diagram illustrating a wake-up circuit 100, according to an embodiment of the present disclosure. Referring to FIG. 1, the wake-up circuit 100 may include a preprocessing unit 110, a comparison unit 120, an output circuit 130, a micro control unit (MCU) 140, and a post-amplifier 150. A sensor node 10 may select an operating mode or low-power mode based on the wake-up operation of the wake-up circuit 100. For example, when the wake-up circuit 100 supplies power to the sensor node 10, the sensor node 10 may have an operating mode. Otherwise, the sensor node 10 may be in a low-power mode. The structure and operation of the wake-up circuit 100 according to an embodiment of the present disclosure are described in detail with reference to FIG. 1.

The preprocessing unit 110 may receive an input signal SI from a sensing electrode 11. The preprocessing unit 110 may generate a comparison unit input signal NI based on the input signal SI. In an embodiment, the comparison unit input signal NI may include a signal, from which noise is removed and which has a specific frequency band. For example, the preprocessing unit 110 may remove noise from the input signal SI, may extract a signal of a specific frequency band, and may generate the comparison unit input signal NI. The preprocessing unit 110 may provide the generated comparison unit input signal NI to the comparison unit 120 and the post-amplifier 150. The detailed structure and operation of the preprocessing unit 110 are described in more detail with reference to FIG. 2.

The comparison unit 120 may receive the comparison unit input signal NI and may generate the comparison unit output signal NO. In an embodiment, the comparison unit 120 may generate the comparison unit output signal NO based on the spike neuron network structure and may provide the comparison unit output signal NO to the output circuit 130. The structure and operation of the comparison unit 120, and the generation of the comparison unit output signal NO are described in detail below with reference to FIGS. 3 and 4.

The output circuit 130 may generate a power signal PS based on the comparison unit output signal NO and an initialization signal IS. The output circuit 130 may perform an initialization operation of the power signal PS according to the initialization signal IS. In an embodiment, the output circuit 130 may include a Muller-C circuit. For example, the output circuit 130 may include the Muller-C circuit that receives the comparison unit output signal NO and the initialization signal IS and outputs the power signal PS. The output operation according to the input of the output circuit 130 is described in more detail with reference to FIG. 5.

The output circuit 130 may supply power to the post-amplifier 150 and the sensor node 10 depending on the power signal PS. In an embodiment, the wake-up circuit 100 may supply power to the sensor node 10 in response to the power signal PS generated by the output circuit 130. For example, the wake-up circuit 100 may supply power to the sensor node 10 in response to the power signal PS of logic 1. In this case, the wake-up circuit 100 may perform a wake-up operation.

In an embodiment, the output circuit 130 may deliver a state signal WS to the MCU 140. For example, the output circuit 130 may deliver the state signal WS, which indicates whether the power signal PS is generated, to the MCU 140.

The MCU 140 may control the operation of the wake-up circuit 100. In an embodiment, the MCU 140 may generate the initialization signal IS based on the state signal WS received from the output circuit 130. For example, the MCU 140 may receive the state signal WS, and may generate the initialization signal IS after a certain period of time. The MCU 140 may provide the generated initialization signal IS to an input of the output circuit 130. The MCU 140 may match the timing of an operation of the MCU 140, which operates in a synchronous mode, with the timing of an operation of the comparison unit 120, which operates in an asynchronous mode, based on an operation of generating the initialization signal IS. In this case, the stability of the operation of the wake-up circuit 100 may be improved.

In an embodiment, the MCU 140 may receive the power signal of the output circuit 130 and may control a power supply to the sensor node 10 of the wake-up circuit 100 based on the received power signal PS. For example, when receiving the power signal PS, which corresponds to logic 1 of the output circuit 130, the MCU 140 may allow the wake-up circuit 100 to provide power to the sensor node 10 and the post-amplifier 150. The generation and related operations of the initialization signal IS of the MCU 140 are described in more detail with reference to FIG. 5 below.

The post-amplifier 150 may generate an output signal SO based on the comparison unit input signal NI received from the preprocessing unit 110. In an embodiment, the post-amplifier 150 may receive the power required for an operation through the power signal PS. For example, the post-amplifier 150 may amplify the comparison unit input signal NI depending on the power signal PS of the output circuit 130 and may generate the output signal SO. The post-amplifier 150 may provide the output signal SO to the outside of the wake-up circuit 100.

In an embodiment, the wake-up circuit 100 of FIG. 1 may perform a wake-up operation by repeatedly receiving the input signal SI of a specific frequency band. The wake-up circuit 100 may switch a mode of the sensor node 10 to operating mode depending on the wake-up operation. According to the above-described operation, the wake-up circuit 100 may allow the sensor node 10 to operate in a low-power mode by not supplying power to the sensor node 10 after a certain period of time.

Figure 2:
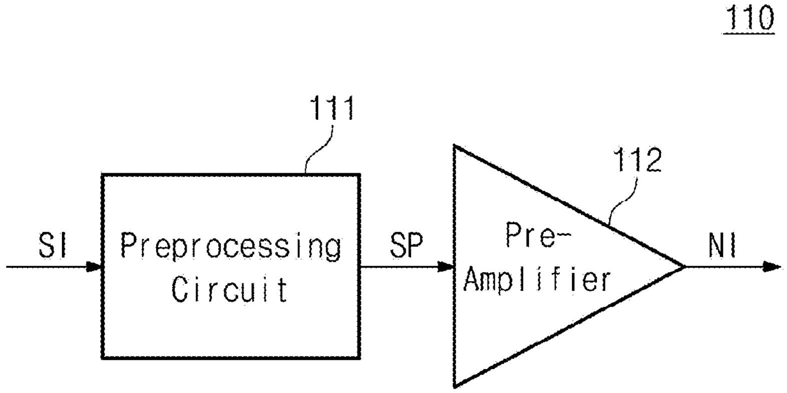
FIG. 2 is a diagram illustrating a preprocessing unit of FIG. 1 in detail, according to an embodiment of the present disclosure.

FIG. 2 is a diagram illustrating the preprocessing unit 110 of FIG. 1 in detail, according to an embodiment of the present disclosure. Referring to FIG. 2, the preprocessing unit 110 may include a preprocessing circuit 111 and a pre-amplifier 112. The structure and operation of the preprocessing unit 110 according to an embodiment of the present disclosure are described in detail with reference to FIG. 2.

The preprocessing circuit 111 may remove noise of the input signal SI, and may extract signals of specific band frequencies from the input signal SI. In an embodiment, the preprocessing circuit 111 may include a rectifier or filter. For example, the preprocessing circuit 111 may remove external noise through a rectifier, and may extract signals of a specific band through a band pass filter (BPF). In this case, the preprocessing circuit 111 may only leave signals of the desired frequency band. The preprocessing circuit 111 may provide the pre-amplifier 112 with the extracted signal as a preprocessing signal SP.

The pre-amplifier 112 may amplify the preprocessing signal SP received from the preprocessing circuit 111. In an embodiment, the pre-amplifier 112 may generate the comparison unit input signal NI by amplifying the preprocessing signal SP. The pre-amplifier 112 may provide the generated comparison unit input signal NI to the comparison unit 120 and the post-amplifier 150. FIG. 1 shows the preprocessing unit 110 including the pre-amplifier 112, but the scope of the present disclosure is not limited thereto. As in a case that the power of the input signal SI received through the sensing electrode 11 is sufficiently large, the preprocessing unit 110 may not include the pre-amplifier 112 depending on the input signal SI. It should be understood that a case where the preprocessing unit 110 does not include the pre-amplifier 112 falls within the scope of the present disclosure.

Figure 3:
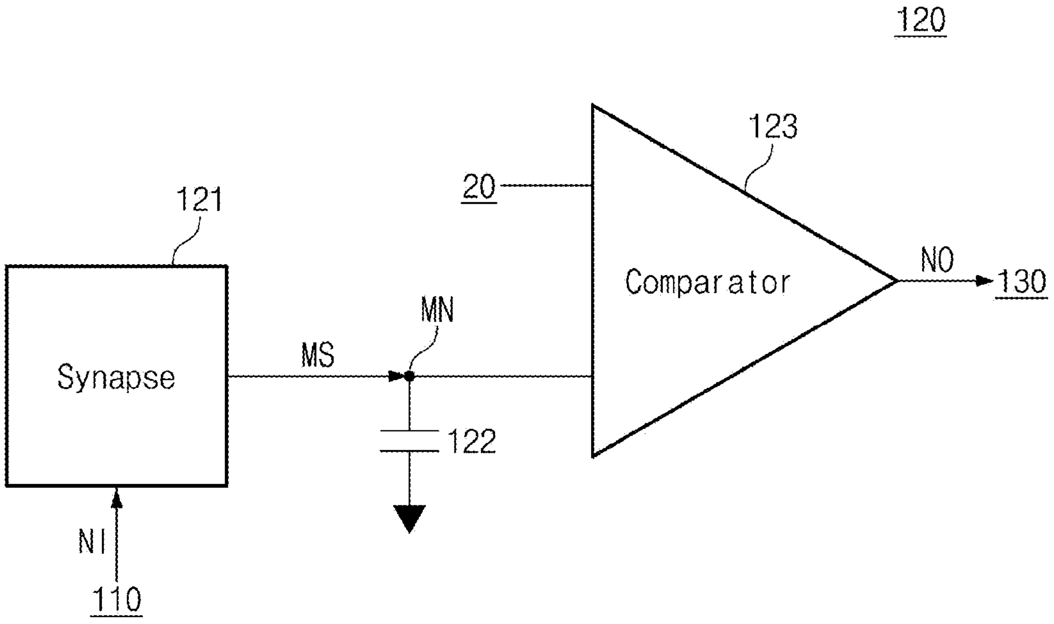
FIG. 3 is a diagram illustrating a comparison unit of FIG. 1 in detail, according to an embodiment of the present disclosure.

FIG. 3 is a diagram illustrating the comparison unit 120 of FIG. 1 in detail, according to an embodiment of the present disclosure. In an embodiment, the comparison unit 120 of FIG. 3 may include a spike neuron structure. Referring to FIG. 3, the comparison unit 120 may include a synapse 121, a membrane capacitor 122, and a comparator 123. The operation and structure of the comparison unit 120 according to an embodiment of the present disclosure are described in detail with reference to FIG. 3.

The synapse 121 may receive the comparison unit input signal NI from the preprocessing unit 110 of FIG. 1. The synapse 121 may generate a membrane signal MS from the comparison unit input signal NI based on a weight. In an embodiment, the weight may be data pre-stored by a user, or data generated by spike neuron network learning. For example, the synapse 121 may generate the membrane signal MS from the comparison unit input signal NI based on the weight pre-stored by the user. The synapse 121 may transmit the generated membrane signal MS to the membrane node MN.

The membrane capacitor 122 may accumulate the membrane signal MS transmitted to the membrane node MN. In an embodiment, one end of the membrane capacitor 122 may be connected to the membrane node MN, and the other end thereof may be connected to a ground node. In an embodiment, as the membrane capacitor 122 accumulates the membrane signal MS, the voltage between the opposite ends of the membrane capacitor 122 may increase. A voltage change (a potential change of the membrane node MN) between the opposite ends of the membrane capacitor 122 according to the accumulation of the membrane signal MS is described in more detail with reference to FIG. 6.

The comparator 123 may generate the comparison unit output signal NO based on the potential of the membrane node MN and a threshold potential 20. The comparator 123 may produce an output in a form of a spike. In an embodiment, when the potential of the membrane node MN is greater than the threshold potential 20, the comparator 123 may generate the comparison unit output signal NO. For example, when the potential of the membrane node MN is greater than the threshold potential 20, the comparator 123 may generate the comparison unit output signal NO in the form of a spike. The comparison unit output signal NO generated by the comparator 123 may be provided to one of inputs of the output circuit 130.

The comparison unit 120 may have a spike neuron network structure of the above-described form. The comparison unit 120 may allow the wake-up circuit 100 of FIG. 1 to have more robust characteristics against noise based on the spike neuron network structure. The comparison unit 120 may reduce power consumption by allowing the wake-up circuit 100 to operate in an asynchronous low-power state.

In a case of a single spike neuron structure such as the comparison unit 120 in FIG. 3, because the degree of robustness to noise is limited, a structure of the comparison unit 120 with a plurality of spike neuron structures may be proposed. Hereinafter, the comparison unit 120 having the plurality of spike neuron structures will be described in detail with reference to FIG. 4.

Figure 4:
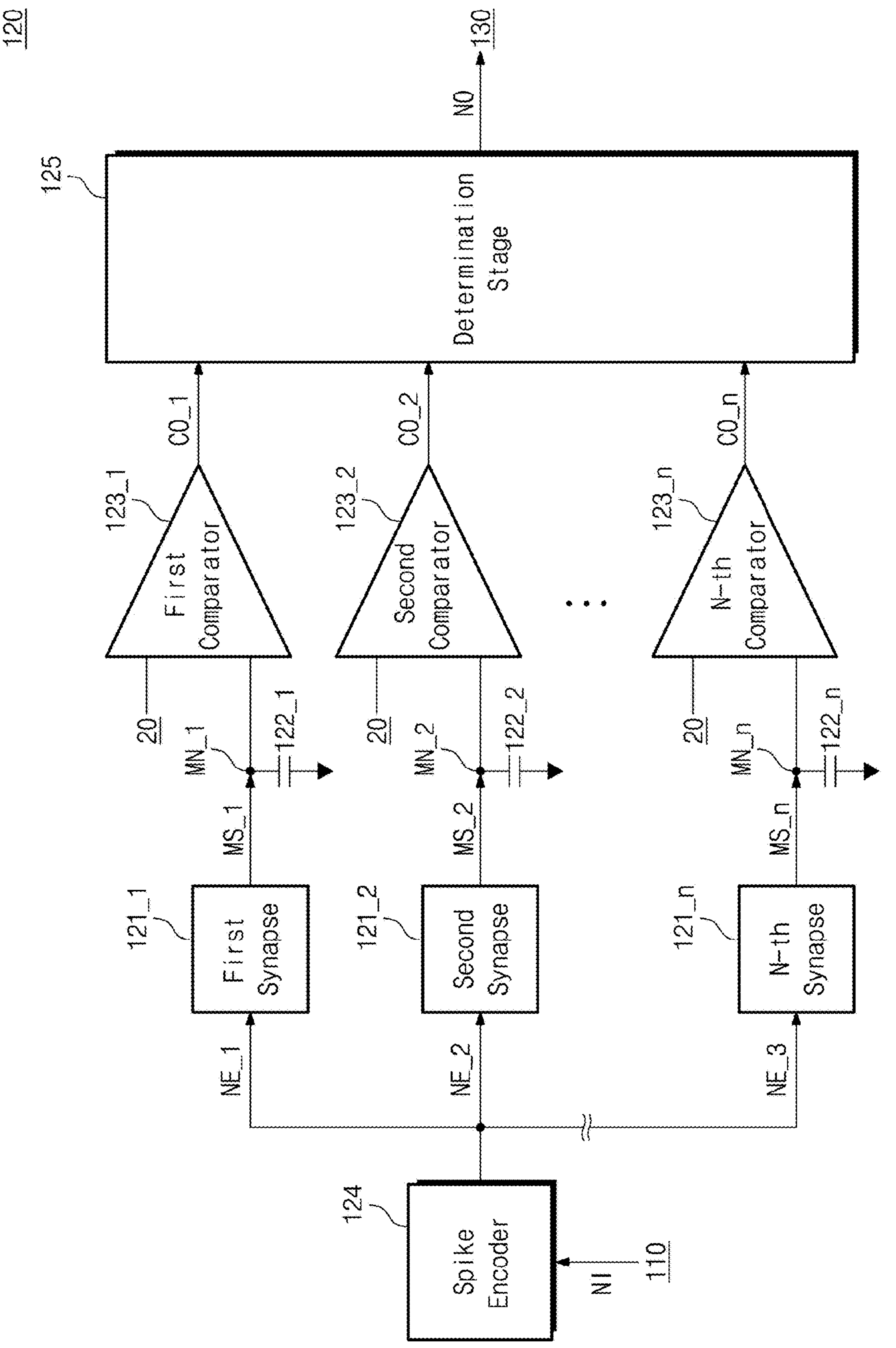
FIG. 4 is a diagram illustrating a comparison unit of FIG. 1 in detail, according to an embodiment of the present disclosure.

FIG. 4 is a diagram illustrating the comparison unit 120 of FIG. 1 in detail, according to an embodiment of the present disclosure. In an embodiment, the comparison unit 120 of FIG. 4 may have a plurality of spike neuron network structures. Referring to FIG. 4, the comparison unit 120 may include synapses 121_1 to **121_*n*, membrane capacitors 122_1 to 122_*n*, comparators 123_1 to 123_*n*, a spike encoder 124, and a determination stage 125. The comparison unit 120 having the plurality of spike neuron structures is described in detail with reference to FIG. 4**.

The synapses 121_1 to **121_*n* may generate corresponding membrane signals MS_1 to MS_n by respectively applying weights to encoding signals NE_1 to NE_n received from the spike encoder 124. In an embodiment, the synapses 121_1 to 121_*n* may have different weights, respectively. Each of the weights may be data pre-stored by a user, or data generated by spike neuron network learning. For example, the first synapse 121_1 may apply a first weight to the first encoding signal NE_1 and may generate the first membrane signal MS_1. Likewise, the n-th synapse 121_*n*** may apply an n-th weight to the n-th encoding signal NE_n and may generate the n-th membrane signal MS_n. The membrane signals MS_1 to MS_n may be accumulated in the corresponding membrane nodes MN_1 to MN_n, respectively.

Each of the membrane capacitors 122_1 to **122_*n* may have the same structure and operation as that of the membrane capacitor 122 described in FIG. 3** and may operate in the same manner. Thus, additional description will be omitted to avoid redundancy.

The comparators 123_1 to **123_*n* may generate comparison signals CO_1 to CO_n by comparing the potential of membrane nodes MN_1 to MN_n and the threshold potential 20, respectively. In an embodiment, when the potential of each of the membrane nodes MN_1 to MN_n is greater than the threshold potential 20, the corresponding comparators 123_1 to 123_*n* may fire. For example, when the potential of the first membrane node MN_1 is greater than the threshold potential 20, the first comparator 123_1 may fire and may generate the first comparison signal CO_1. In an embodiment, the comparators 123_1 to 123_*n* may provide the comparison signals CO_1 to CO_n to the determination stage 125. For example, the first comparator 123_1 may provide the first comparison signal CO_1 to the determination stage 125**.

The spike encoder 124 may encode the comparison unit input signal NI. In an embodiment, the spike encoder 124 may deliver the encoding signals NE_1 to NE_n to the synapses 121_1 to **121_*n*. The encoding signals NE_1 to NE_n may be signals in the form of a spike. For example, the spike encoder 124 may generate the encoding signals NE_1 to NE_n in the form of a spike based on the comparison unit input signal NI and may deliver the encoding signals NE_1 to NE_n to the synapses 121_1 to 121_*n***, respectively.

The determination stage 125 may generate the comparison unit output signal NO based on the received comparison signals CO_1 to CO_n. In an embodiment, the determination stage 125 may determine whether the received comparison signals CO_1 to CO_n are caused by the input signal SI or noise, and may determine whether to generate the comparison unit output signal NO. For example, when determining that the received comparison signals CO_1 to CO_n are caused by a signal, the determination stage 125 may generate the comparison unit output signal NO. When determining that the received comparison signals CO_1 to CO_n are caused by noise, the determination stage 125 may not generate the comparison unit output signal NO.

Intelligence based on the spike neural network structure may be given to the comparison unit 120 in FIG. 4 through the above-described configurations and operations. The comparison unit 120 may allow the wake-up circuit 100, which is robust to noise, to be implemented through the given intelligence.

Figure 5:
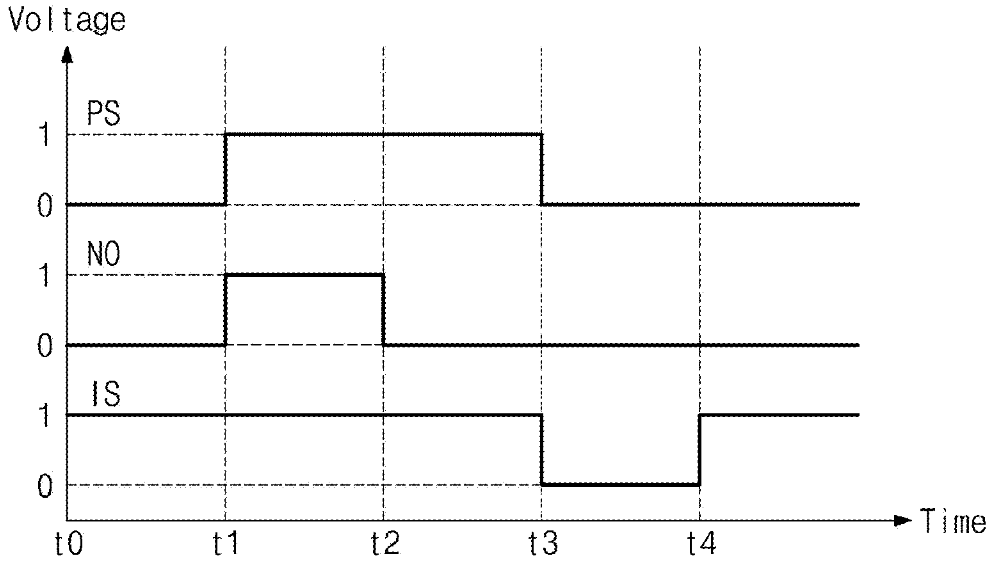
FIG. 5 is a timing diagram showing signals of the input terminal of an output circuit of FIG. 1 and output signals over time, according to an embodiment of the present disclosure.

FIG. 5 is a timing diagram showing an operation according to an input of the output circuit 130 of FIG. 1. Referring to FIG. 5, it shows changes in the comparison unit output signal NO, the initialization signal IS, and the power signal PS of FIG. 1 over time. The input/output operation of the output circuit 130 of FIG. 1 is described in detail with reference to FIGS. 1 and 5.

Referring to FIG. 5, a first section (from t0 to t1) may be an initial state section. In an embodiment, the wake-up circuit 100 of the first section (t0~t1) may receive the input signal SI. Signals may be accumulated in the membrane nodes MN_1 to MN_n to generate the comparison unit output signal NO through the comparison unit 120 of FIG. 2 or 3. In this case, as the output of the comparator 123 is not generated, the comparison unit output signal NO may have logic 0. In an embodiment, the initialization signal IS may have the value of logic 1. In an embodiment, the output circuit 130 in FIG. 1 may operate as a Muller-C circuit, and the power signal PS may have a value of logic 0.

The second section (from t1 to t2) may be a wake-up section. In an embodiment, the comparison unit 120 of the wake-up circuit 100 of a second section (from t1 to t2) may generate the comparison unit output signal NO. For example, the comparison unit 120 may generate the comparison unit output signal NO in a form of a spike at the first time point t1 based on the operation of the determination stage 125 in FIG. 4. The comparison unit output signal NO may have a value of logic 1 from the first time point t1. The initialization signal IS may maintain the value of logic 1, which is the same as the state at the 0-th time point t0. In an embodiment, the output circuit 130 may operate in the same way as the Muller-C circuit. As all inputs are logic 1, logic 1 may be output as the power signal PS from the first time point t1.

A third section (from t2 to t3) may be a maintenance section. In an embodiment, in the third section (from t2 to t3), the comparison unit output signal NO may return to logic 0 again. For example, at the second time point t2, the comparison unit output signal NO may return to logic 0. In the third section (from t2 to t3), the initialization signal IS may maintain logic 1. In an embodiment, the output circuit 130 may operate in the same way as the Muller-C circuit. As only one of the two inputs changes to logic 0, the output circuit 130 may maintain an output of logic 1 as the power signal PS.

A fourth section (from t3 to t4) may be an initialization section. In an embodiment, in the fourth section (from t3 to t4), the initialization signal IS may change to logic 0. In an embodiment, the output circuit 130 operates in the same way as the Muller-C circuit. As all inputs of the output circuit 130 become logic 0, the power signal PS may become logic 0 from the third time point t3.

After a fifth section (from t5), the wake-up circuit 100 may operate in the same manner as it does at the 0th to fourth time points (t0 to t4). The initialization signal IS may be changed back to logic 1. On the basis of the above-described operations, the wake-up circuit 100 may perform a wake-up operation and an initialization operation, and may select an operating mode or low power mode of the sensor node 10. Moreover, the wake-up circuit 100 may perform timing correction between the comparison unit 120 performing an asynchronous operation and the MCU 140 performing a synchronous operation through the initialization signal IS of the MCU 140. On the basis of the above-described operation, the wake-up circuit 100 may allow the comparison unit 120 performing the asynchronous operation, and the MCU 140 performing the synchronous operation, to operate stably.

Referring to FIGS. 1 and 5 together, in a section from the first time point t1 to the third time point t3, the wake-up circuit 100 of FIG. 1 may supply power to the sensor node 10 of FIG. 1. In the section from the first time point t1 to the third time point t3, the sensor node 10 may be in an operating mode. From the 0-th time point t0 to the first time point t1, and from the third time point t3 to the fourth time point t4, the wake-up circuit 100 may not supply power to the sensor node 10 in FIG. 1. From the 0-th time point t0 to the first time point t1, and from the third time point t3 to the fourth time point t4, the sensor node 10 may be in a low power mode.

The several time points t0 to t4 shown in FIG. 5 merely illustrate the temporal sequence. The interval between the time point t0 and the time point t4 does not limit the actual time interval of the operation of the wake-up circuit 100. Intervals between the 0-th time point t0, the first time point t1, the second time point t2, the third time point t3, and the fourth time point t4 may vary depending on the operation type of the wake-up circuit 100 or the operation type of the sensor node 10.

Figure 6:
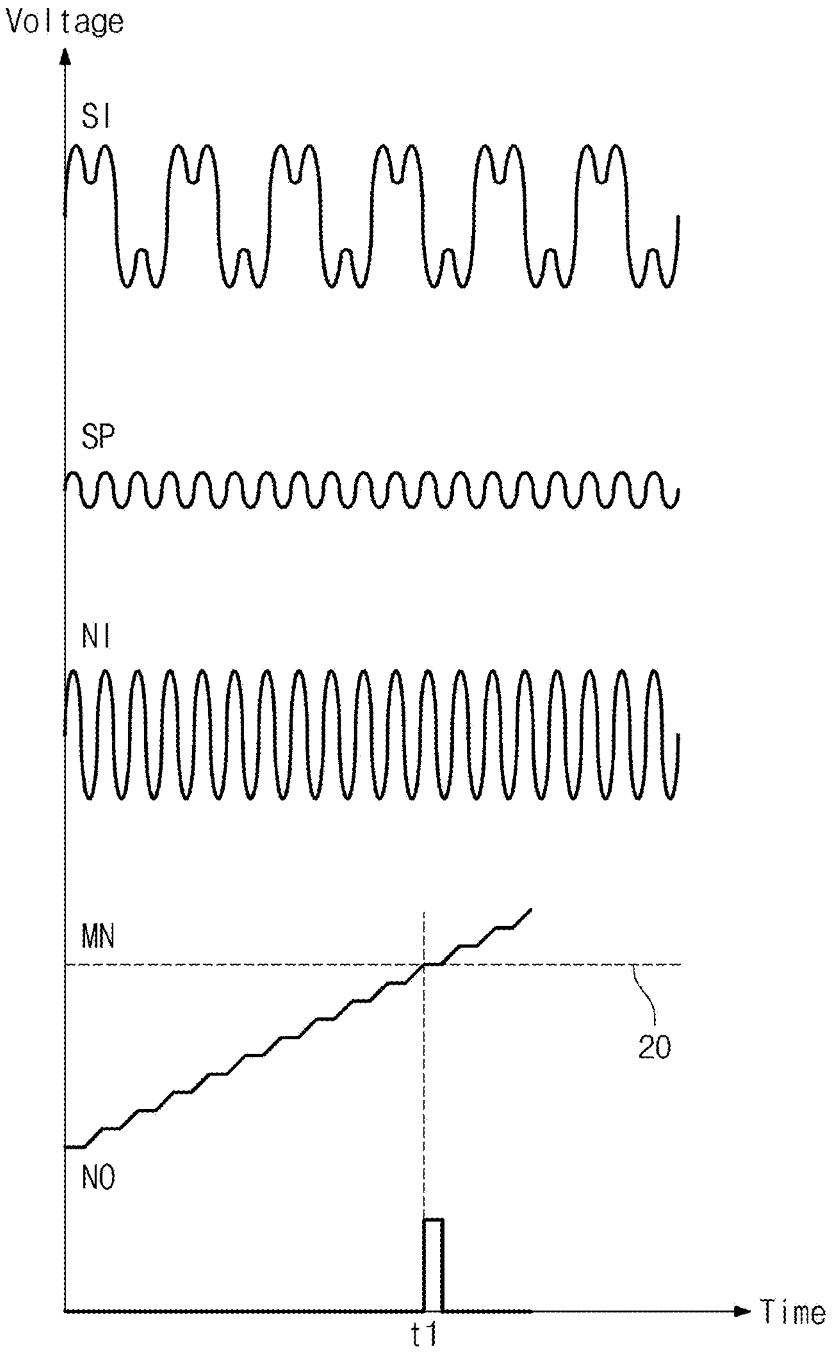
FIG. 6 is a diagram illustrating examples of a preprocessing input signal, a preprocessing signal, a comparison unit input signal, a comparison unit output signal of FIG. 1, and a membrane signal of FIG. 2 over time, according to an embodiment of the present disclosure.

FIG. 6 is a diagram showing an example of signals used in an operation of the wake-up circuit 100 of FIG. 1, focusing on operations from the 0-th time point t0 to the second time point t2 of FIG. 5, according to an embodiment of the present disclosure. Referring to FIG. 6, potentials of the input signal SI, the comparison unit input signal NI, and the comparison unit output signal NO in FIG. 1, the preprocessing signal SP in FIG. 2, and the membrane node MN in FIG. 3 are shown with time. An operation of a wake-up circuit according to an embodiment of the present disclosure is described with reference to FIGS. 1 to 3 and FIG. 6.

In an embodiment, the input signal SI may include eigen signals of various frequencies and external noise. For example, referring to FIG. 6, the input signal SI may be a periodic signal having a specific waveform including noise. The form of the input signal SI is an example. The scope of the present disclosure is not limited to the periodic signal. In an embodiment, the input signal SI may be an aperiodic signal.

The preprocessing signal SP may be generated as the input signal SI passes through the preprocessing circuit 111 of FIG. 2. In an embodiment, the preprocessing signal SP may include a signal, from which noise is partially removed and which has a specific frequency band. For example, the preprocessing signal SP may be a periodic signal of a specific frequency band. However, the scope of the present disclosure is not limited thereto. The case where the preprocessing signal SP is an aperiodic signal may also be included in the scope of the present disclosure.

The comparison unit input signal NI may be generated as the preprocessing signal SP passes through the pre-amplifier 112 of FIG. 2. In an embodiment, the comparison unit input signal NI may be a signal that has the same frequency component as the preprocessing signal SP, but has amplitude different from that of the preprocessing signal SP. For example, referring to FIG. 6, the comparison unit input signal NI has the same frequency as the preprocessing signal SP, but may has the amplitude greater than the preprocessing signal SP.

Referring to FIG. 3 together, the potential of the membrane node MN may be generated by accumulating the membrane signal MS. The membrane signal MS may be generated by assigning a weight after the comparison unit input signal NI passing through the synapse 121. In an embodiment, the potential of the membrane node MN may increase in a stepwise manner. The reason is that the membrane signal MS accumulated in the membrane node MN may be in a form of a spike. In FIG. 6, time intervals during which the potential of the membrane node MN increases are shown in the same way as each other. The present disclosure is not limited thereto. For example, the time intervals during which the potential increases may be different from each other depending on the type of the input signal SI.

The comparison unit output signal NO may be generated by the comparator 123 of FIG. 2. When the potential of the membrane node MN is higher than the threshold potential 20, the comparator 123 may fire, and may generate the comparison unit output signal NO. In an embodiment, the comparison unit output signal NO may be in the form of a spike. For example, the comparison unit output signal NO may fire at the first time point t1 in FIG. 6 and then return to the initial state. The wake-up circuit 100 may supply power to the sensor node 10 based on the fire of the comparison unit output signal NO, In FIG. 6, it is mainly described that the wake-up circuit 100 of FIG. 1 has the preprocessing unit 110 of FIG. 2 and the comparison unit 120 of FIG. 3, but the scope of the present disclosure is not limited thereto. It should be understood that the wake-up circuit 100 may operate based on the signals shown in FIG. 6 even when the wake-up circuit 100 of FIG. 1 includes the preprocessing unit 110 of FIG. 2 and the comparison unit 120 of FIG. 4. Moreover, forms of signals shown in FIG. 6 are examples. The scope of the present disclosure is not limited thereto.

Figure 7:
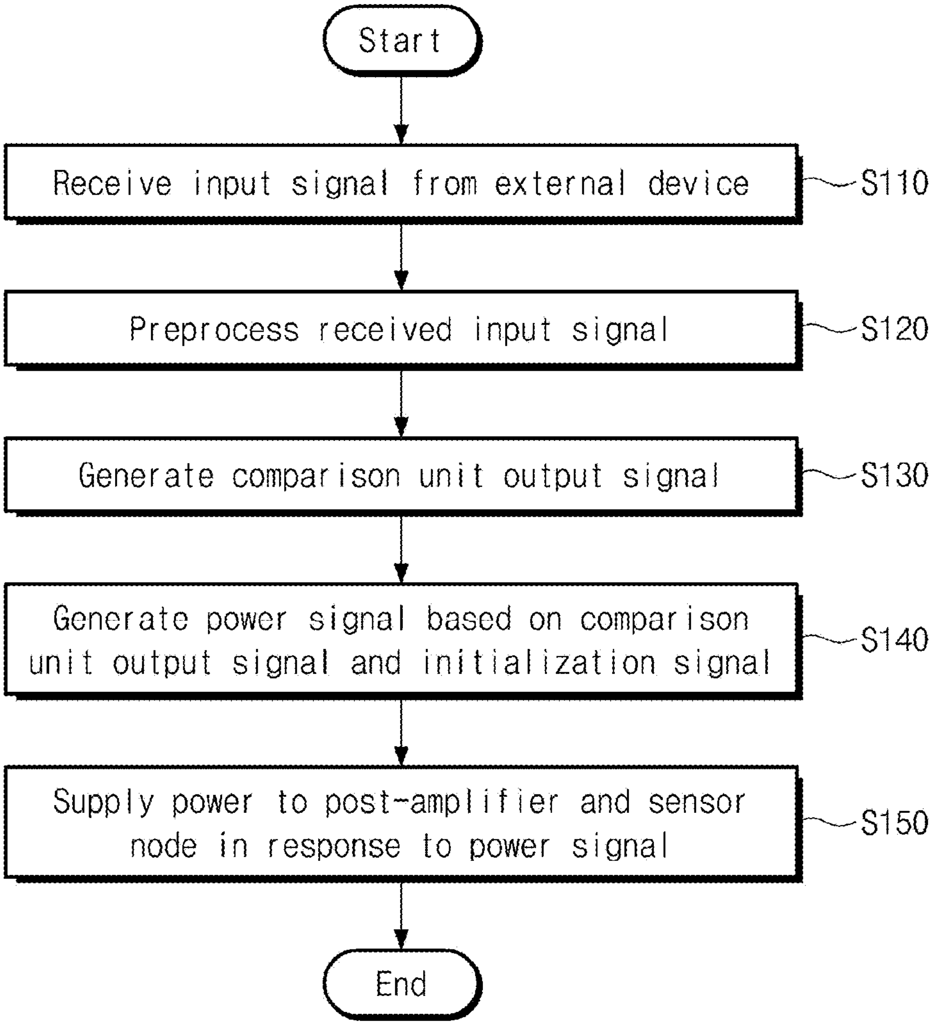
FIG. 7 is a flowchart showing a wake-up operation sequence of a wake-up circuit of FIG. 1, according to an embodiment of the present disclosure.

FIG. 7 is a flowchart showing a wake-up operation sequence of the wake-up circuit 100 of FIG. 1, according to an embodiment of the present disclosure. A wake-up operation process of the wake-up circuit 100 of FIG. 1 is described with reference to FIGS. 1 and 7.

In operation S110, the wake-up circuit 100 may receive the input signal SI from the outside. In an embodiment, the wake-up circuit 100 may receive the input signal SI through the sensing electrode 11. For example, the wake-up circuit 100 may receive the input signal SI, which is obtained by mixing eigen signals of a plurality of frequencies, through the sensing electrode 11.

In operation S120, the wake-up circuit 100 may preprocess the received input signal SI. In an embodiment, the wake-up circuit 100 may generate the comparison unit input signal NI through the preprocessing unit 110. For example, the wake-up circuit 100 may generate the comparison unit input signal NI, which includes only the frequency of a specific band after the preprocessing unit 110 removes noise from the input signal SI.

In operation S130, the wake-up circuit 100 may generate the comparison unit output signal NO. In an embodiment, the wake-up circuit 100 may generate the comparison unit output signal NO based on the comparison unit input signal NI through the comparison unit 120 of FIG. 3 or the comparison unit 120 of FIG. 4. For example, the wake-up circuit 100 may include the comparison unit 120 of FIG. 4, and may generate the comparison unit output signal NO by accumulating and processing the comparison unit input signal NI through the comparison unit 120. In an embodiment, the comparison unit output signal NO may include a spike output.

In operation S140, the wake-up circuit 100 may generate the power signal PS based on the comparison unit output signal NO and the initialization signal IS. In an embodiment, the wake-up circuit 100 may generate the power signal PS through the output circuit 130. For example, the wake-up circuit 100 may generate the power signal PS through the output circuit 130, which has the initialization signal IS and the comparison unit output signal NO as input signals. For a more detailed example, the output circuit 130 may operate in the same way as the Muller-C circuit. When both the initialization signal IS and the comparison unit output signal NO become logic 1, the output circuit 130 may generate the power signal PS.

In operation S150, the wake-up circuit 100 may supply power to the sensor node 10 and the post-amplifier 150 in response to the power signal PS. For example, referring to FIG. 5 together, from the first time point t1 to the third time point t3, the wake-up circuit 100 may supply power to the sensor node 10 and the post-amplifier 150 based on the fact that the power signal PS is logic 1. In this case, the sensor node 10 may be in an operating mode.

According to the operations described above, the wake-up circuit 100 of FIG. 1 may supply power to the sensor node 10. When the sensor node 10 receives power from the wake-up circuit 100, the sensor node 10 may change from a low-power mode to an operating mode.

The above description refers to embodiments for implementing the present disclosure. Embodiments in which a design is changed simply or which are easily changed may be included in the present disclosure as well as an embodiment described above. In addition, technologies that are easily changed and implemented by using the above embodiments may be included in the present disclosure. Accordingly, it will be apparent to those of ordinary skill in the art that various changes and modifications may be made to the above embodiments without departing from the spirit and scope of the present disclosure as set forth in the following claims.

According to an embodiment of the present disclosure, a wake-up circuit that consumes low power, is robust to external noise, and has an uncomplicated structure is provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A wake-up circuit comprising:

a preprocessing unit configured to generate a first signal by removing noise from an input signal;

a comparison unit configured to generate a second signal based on the first signal and weight data;

an output circuit configured to generate a power signal based on the second signal and an initialization signal; and a micro control unit (MCU) configured to generate the initialization signal based on a state signal received from the output circuit, wherein the comparison unit includes a spike neuron network structure configured to generate the second signal by applying the weight data to the first signal, and wherein the output circuit supplies power to an external sensor node in response to the power signal.

2. The wake-up circuit of claim 1, wherein the comparison unit includes:

a synapse configured to receive the first signal and to apply the weight data to the first signal;

a membrane capacitor configured to accumulate an output of the synapse and having an end connected to a ground node; and a comparison unit configured to generate the second signal by comparing a potential of the membrane capacitor and a threshold potential.

3. The wake-up circuit of claim 1, wherein the comparison unit includes:

a spike encoder configured to receive the first signal and to generate a plurality of encoding signals;

a plurality of synapses, which respectively receive the encoding signals and which respectively apply different weights;

a plurality of membrane capacitors, which respectively accumulate outputs of the plurality of synapses, and each of which has one end connected to a ground node;

a plurality of comparators configured to generate comparison signals by respectively comparing potentials of the membrane capacitors with a threshold potential; and a determination stage configured to receive the comparison signals, and to generate the second signal by determining whether the comparison signals are caused by noise or the input signal.

4. The wake-up circuit of claim 1, wherein the weight data includes data input by a user or data generated based on learning of the spike neuron network structure.

5. The wake-up circuit of claim 1, wherein the output circuit includes a Muller-C circuit that has the initialization signal and the second signal as inputs and generates the power signal as an output.

6. The wake-up circuit of claim 1, further comprising:

a post-amplifier configured to receive power based on the power signal and to generate an output signal by amplifying the first signal.

7. The wake-up circuit of claim 1, wherein the preprocessing unit includes:

a preprocessing circuit configured to remove noise from the input signal and to generate a preprocessing signal by filtering signals of specific band frequencies; and a pre-amplifier configured to generate the first signal by amplifying the preprocessing signal.

8. The wake-up circuit of claim 7, wherein the preprocessing circuit includes:

a rectifier configured to remove the noise of the input signal; and a filter configured to filter the signals of the specific band frequencies of the input signal.

9. An operating method of a wake-up circuit, the operating method comprising:

receiving an input signal from an external device;

generating a first signal having frequencies of a specific band by removing noise from the input signal;

generating a second signal by applying weight data to the first signal based on a spike neuron network structure;

generating a power signal based on the second signal and an initialization signal; and supplying power to a sensor node in response to the power signal.

10. The operating method of claim 9, wherein the second signal is generated through a comparison unit, and wherein the comparison unit includes:

a synapse configured to receive the first signal and to apply the weight data to the first signal;

a membrane capacitor configured to accumulate an output of the synapse and having an end connected to a ground node; and a comparison unit configured to generate the second signal by comparing a potential of the membrane capacitor and a threshold potential.

11. The operating method of claim 9, wherein the second signal is generated through a comparison unit, and wherein the comparison unit includes:

a spike encoder configured to receive the first signal and to generate a plurality of encoding signals;

a plurality of synapses, which respectively receive the encoding signals and which respectively apply different weights;

a plurality of membrane capacitors, which respectively accumulate outputs of the plurality of synapses, and each of which has one end connected to a ground node;

a plurality of comparators configured to generate comparison signals by respectively comparing potentials of the membrane capacitors with a threshold potential; and a determination stage configured to receive the comparison signals, and to generate the second signal by determining whether the comparison signals are caused by noise or the input signal.

12. The operating method of claim 9, wherein the weight data includes data input by a user or data generated based on learning of the spike neuron network structure.

13. The operating method of claim 9, wherein the power signal is generated by an output circuit, and wherein the output circuit includes a Muller-C circuit that has the initialization signal and the second signal as inputs and generates the power signal as an output.

14. The operating method of claim 9, further comprising: supplying power to a post-amplifier, which is included in the wake-up circuit and configured to amplify the first signal, based on the power signal.

15. The operating method of claim 9, wherein the first signal is generated by a preprocessing unit, and wherein the preprocessing unit includes:

a preprocessing circuit configured to remove noise from the input signal and to generate a preprocessing signal by filtering signals of specific band frequencies; and a pre-amplifier configured to generate the first signal by amplifying the preprocessing signal.

16. The operating method of claim 15, wherein the preprocessing circuit includes:

a rectifier configured to remove the noise of the input signal; and a filter configured to filter the signals of the specific band frequencies of the input signal.

* * * * *